United States Patent
Hassani et al.

(10) Patent No.: US 11,151,817 B2
(45) Date of Patent: Oct. 19, 2021

(54) REDUCING LATENCY IN A PASSIVE ENTRY SYSTEM OF A VEHICLE

(71) Applicant: Ford Global Technologies, LLC, Dearborn, MI (US)

(72) Inventors: Ali Hassani, Ann Arbor, MI (US); Hamid M. Golgiri, Livonia, MI (US); Kirk Leonard, Orchard Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/694,450

(22) Filed: Nov. 25, 2019

(65) Prior Publication Data

US 2021/0158638 A1 May 27, 2021

(51) Int. Cl.
*G07C 9/00* (2020.01)
*B60R 25/24* (2013.01)
*B60R 25/20* (2013.01)

(52) U.S. Cl.
CPC ...... *G07C 9/00309* (2013.01); *B60R 25/2009* (2013.01); *B60R 25/245* (2013.01); *B60R 2325/202* (2013.01); *G07C 2009/00404* (2013.01); *G07C 2009/00523* (2013.01)

(58) Field of Classification Search
CPC .................................................. G07C 9/00309
See application file for complete search history.

(56) References Cited

U.S. PATENT DOCUMENTS

| | | | |
|---|---|---|---|
| 8,093,987 B2 * | 1/2012 | Kurpinski | ........... B60R 25/2009 340/5.64 |
| 8,768,565 B2 | 7/2014 | Jefferies et al. | |
| 9,194,168 B1 | 11/2015 | Lu et al. | |
| 9,813,541 B2 | 11/2017 | Miu et al. | |
| 9,953,283 B2 | 4/2018 | Sweeney et al. | |
| 9,963,106 B1 | 5/2018 | Ricci | |
| 2003/0038733 A1 * | 2/2003 | Willats | ............... G07C 9/00309 340/12.22 |

(Continued)

OTHER PUBLICATIONS

Pradeep Shah, "Hyundai 'Digital Key': Now use smartphone to start and lock/unlock car!" Web page <https://www.financialexpress.com/auto/car-news/hyundai-digital-key-now-use-smartphone-to-start-and-lock-unlock-car/1505458/.html>, 7 pages, retrieved from the Internet on Oct. 27, 2020.

*Primary Examiner* — Qutbuddin Ghulamali
(74) *Attorney, Agent, or Firm* — Frank Lollo; Eversheds Sutherland (US) LLP

(57) ABSTRACT

Exemplary embodiments described in this disclosure are generally directed to systems and methods for reducing latency in a passive entry system of a vehicle. In an exemplary method, a computer detects a presence of a passive entry device inside a passive entry zone of the vehicle. The passive entry device may be a phone-as-a-key (PaaK) device or a key fob, and the passive entry zone is an area around the vehicle that is monitored by a wireless detection system of the vehicle. The computer authenticates the passive entry device, which can include determining an identity of an individual authorized to use the passive entry device. Upon successful authentication, the computer may unlock a door of the vehicle and provide a visual prompt to the individual to unlatch the unlocked door. The visual prompt can include an unlatch icon displayed upon a door access panel of the vehicle.

19 Claims, 7 Drawing Sheets

(56) References Cited

U.S. PATENT DOCUMENTS

| | | | |
|---|---|---|---|
| 2004/0119628 A1* | 6/2004 | Kumazaki | G07C 9/00309 |
| | | | 341/176 |
| 2008/0068128 A1* | 3/2008 | Ghabra | G07C 9/00309 |
| | | | 340/5.61 |
| 2015/0148989 A1* | 5/2015 | Cooper | H04L 67/306 |
| | | | 701/2 |

* cited by examiner

REDUCING LATENCY IN A PASSIVE ENTRY SYSTEM OF A VEHICLE

FIELD OF THE DISCLOSURE

This disclosure generally relates to operations associated with a vehicle and more particularly relates to operations associated with entering a vehicle.

BACKGROUND

Car manufacturers constantly strive to provide various features and devices that make it more convenient or pleasurable for a person to drive a vehicle. For example, some car manufacturers now offer a key fob that eliminates the need for a person to insert a key into a door lock cylinder or into an ignition lock. However, the key fob may be stolen and misused. Some car manufacturers offer a passive entry and start system, which is generally referred to as a phone-as-a-key (PaaK) system that involves the use of a smartphone. A driver of the vehicle gets into the vehicle and enters a unique password into the smartphone that enables the operation of the engine via the engine-start push-button in the vehicle. In a variation of this system, the driver may get into the vehicle and enter the password into an infotainment system in the vehicle that then enables the operation of the engine-start push-button. However, password entry systems may be vulnerable to hacking and malicious misuse. Consequently, it is desirable to provide security measures for protecting passwords and to also execute additional actions such as verifying the authenticity of a device being used to enter/start a vehicle, and verifying whether a person using the device is authorized to use the device for entering/starting the vehicle. However, such operations can be time-consuming, and the delays involved in performing such security operations may annoy users of the device. It is therefore desirable to minimize the time involved in applying security measures upon passive devices that are used to enter a vehicle and/or to start the vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
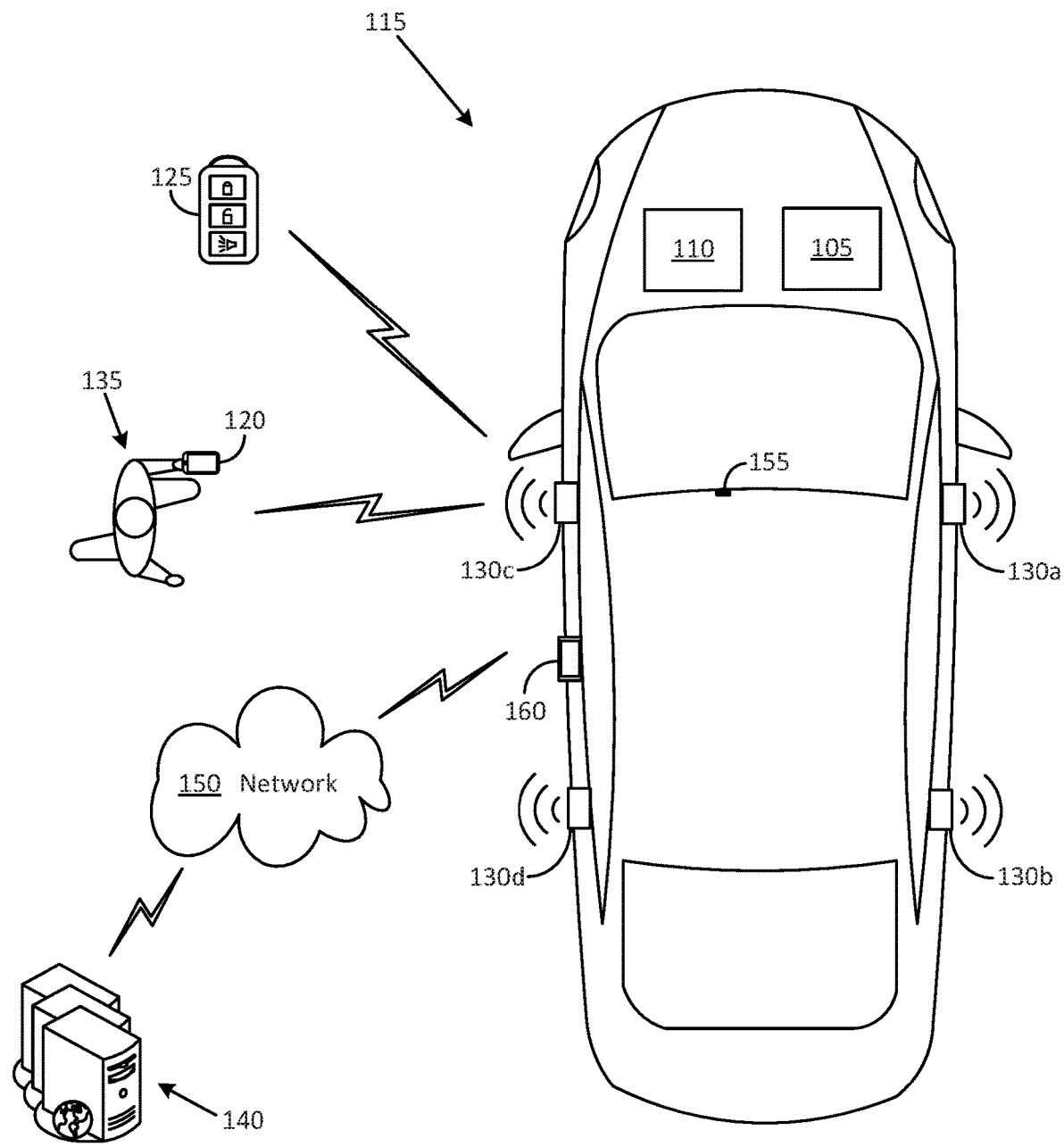
FIG. 1 shows an exemplary vehicle that supports various types of passive entry operations in accordance with the disclosure.

In terms of a general overview, certain embodiments described in this disclosure are directed to systems and methods for reducing latency in a passive entry system of a vehicle. In an exemplary method, a computer detects a presence of a passive entry device inside a passive entry zone of the vehicle. The passive entry zone is an area around the vehicle that can be monitored by a wireless detection system of the vehicle for detecting the passive entry device. Some exemplary passive entry devices include a phone-as-a-key (PaaK) device and a passive-entry-passive-start (PEPS) key fob. The computer authenticates the passive entry device, which can include determining an identity of an individual who is authorized to use the passive entry device. Upon successful authentication, the computer may unlock a door of the vehicle and provide a visual prompt to the individual for unlatching the unlocked door. The visual prompt may be provided in various ways, such as in the form of an unlatch icon displayed upon a door access panel of the vehicle or upon a display screen of a smartphone carried by the individual.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience, and such words and terms should be interpreted as referring to various objects and actions that are generally understood in various forms and equivalencies by persons of ordinary skill in the art. For example, words such as "wireless" or "wirelessly" as used herein in the context of communication links are not intended to preclude other forms of communication links such as optical communication links and wired communication links that may be used alternatively. It should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 shows an exemplary vehicle 115 that supports various types of passive entry operations. The vehicle 115 may be any of various types of vehicles, such as a gasoline powered vehicle, an electric vehicle, a hybrid electric vehicle, or an autonomous vehicle, and may include components such as a vehicle computer 110, a keyless entry management system 105, a door access panel 160, and a wireless communication system. The vehicle computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). In some cases, the vehicle computer 110 may include more than one computer such as, for example, a first computer that controls engine operations and a second computer that performs actions such as managing an anti-theft system and/or an infotainment system provided in the vehicle 115.

The keyless entry management system 105 may be configured to control various operations such as authenticating a passive entry device carried by a person approaching the vehicle 115, unlocking of the doors of the vehicle 115 upon authenticating the passive entry device locking, and unlatching a door of the vehicle 115 upon receiving an input from the person.

In an exemplary implementation in accordance with the disclosure, the keyless entry management system 105 may be configured to support wireless communications with one or more PaaK devices and one or more PEPS key fobs. In this exemplary implementation, a PaaK device 120 can be a smartphone configured to run a PaaK software application. The PaaK software application allows the PaaK device 120 to be used for performing various operations such as locking or unlocking a door of the vehicle 115 and/or for starting the engine of the vehicle 115. In at least some cases, the PaaK device 120 may eliminate the need to use a factory key fob, which can prove particularly useful in certain situations such as when the factory key fob is lost or has been misplaced by accident.

The PaaK device 120 may use one or more of various wireless technologies such as Bluetooth®, Ultra-Wideband, Wi-Fi, Zigbee®, or near-field-communications (NFC), for carrying out wireless communications. In an exemplary embodiment, a set of wireless communication nodes 130a, 130b, 130c, and 130d may be provided on the body of the vehicle 115. In an alternative implementation, a single wireless communication node may be mounted upon the roof of the vehicle 115. The PaaK device 120 may communicate with the vehicle computer 110 and/or the keyless entry management system 105 via one or more of the wireless communication nodes 130a, 130b, 130c, and 130d, so as to allow, for example, a driver 135 of the vehicle 115 to unlock a door of the vehicle 115 or to start the engine before entering the vehicle 115.

The keyless entry management system 105 may use some or all of the wireless communication nodes 130a, 130b, 130c, and 130d to communicate with the PaaK device 120. In one exemplary implementation, the keyless entry management system 105 may use three or more of the wireless communication nodes 130a, 130b, 130c, and 130d to carry out a received signal strength indication (RSSI) and/or a time-of-flight (ToF) trilateration procedure to determine a location of the PaaK device 120. In another exemplary implementation, the keyless entry management system 105 may use one or more of the wireless communication nodes 130a, 130b, 130c, and 130d, such as, for example, the wireless communication node 130a, to detect the PaaK device 120 using radio frequency identification (RFID) techniques.

The PEPS key fob 125 may use one or more of various wireless technologies such as Bluetooth®, Ultra-Wideband, Wi-Fi, Zigbee®, or near-field-communications (NFC), for carrying out wireless communications. In one exemplary implementation, the PEPS key fob 125 communicates with one of the wireless communication nodes 130a, 130b, 130c, and 130d to allow a holder of the PEPS key fob 125 to open a door of the vehicle 115 passively, or by depressing a first button on the PEPS key fob 125. The PEPS key fob 125 may include various other buttons, such as a door lock button and a panic button. The PEPS key fob 125 may also be used to start the vehicle 115. This action may be carried out by the keyless entry management system 105 sensing the presence of the PEPS key fob 125 inside the vehicle 115 and enabling the engine-start push-button 155 to allow the driver 135 to start the vehicle 115.

In an exemplary embodiment in accordance with the disclosure, the PEPS key fob 125 is linked to the PaaK device 120. For example, the keyless entry management system 105 may use a key index to recognize that the PEPS key fob 125 and the PaaK device 120 are possessed (and operated) by an individual such as the driver 135 of the vehicle 115. In another exemplary embodiment in accordance with the disclosure, the functionality provided by the PEPS key fob 125 may be provided in a different form such as in the form of an NFC card, an identification card, or a biometric device (eye scanner, facial scanner, etc.).

The exemplary vehicle 115 may include a door access panel 160 that may be located on a driver-side door of the vehicle. Similar keypads may be located on other doors of the vehicle 115. A keypad code that is selected by the driver 135 of the vehicle 115 can be used to operate a key on the door access panel 160 for opening the driver-side door of the vehicle 115. The keyless entry management system 105 may manage various operations associated with the door access panel 160, such as verifying a keypad code entered into the door access panel 160 and/or processing a request for a new keypad code.

In the exemplary embodiment shown in FIG. 1, the keyless entry management system 105 is communicatively coupled to a server computer 140 via a network 150. The network 150 may include any one, or a combination of networks, such as a local area network (LAN), a wide area network (WAN), a telephone network, a cellular network, a cable network, a wireless network, and/or private/public networks such as the Internet. For example, the network 150 may support communication technologies such as Bluetooth®, cellular, near-field communication (NFC), Wi-Fi, Wi-Fi direct, machine-to-machine communication, and/or man-to-machine communication. At least one portion of the network 150 includes a wireless communication link that allows the server computer 140 to communicate with one or more of the wireless communication nodes 130a, 130b, 130c, and 130d on the vehicle 115. The server computer 140 may communicate with the keyless entry management system 105 for various purposes such as for authenticating a passive entry device and/or for identifying an authorized user of the passive entry device.

Figure 2:
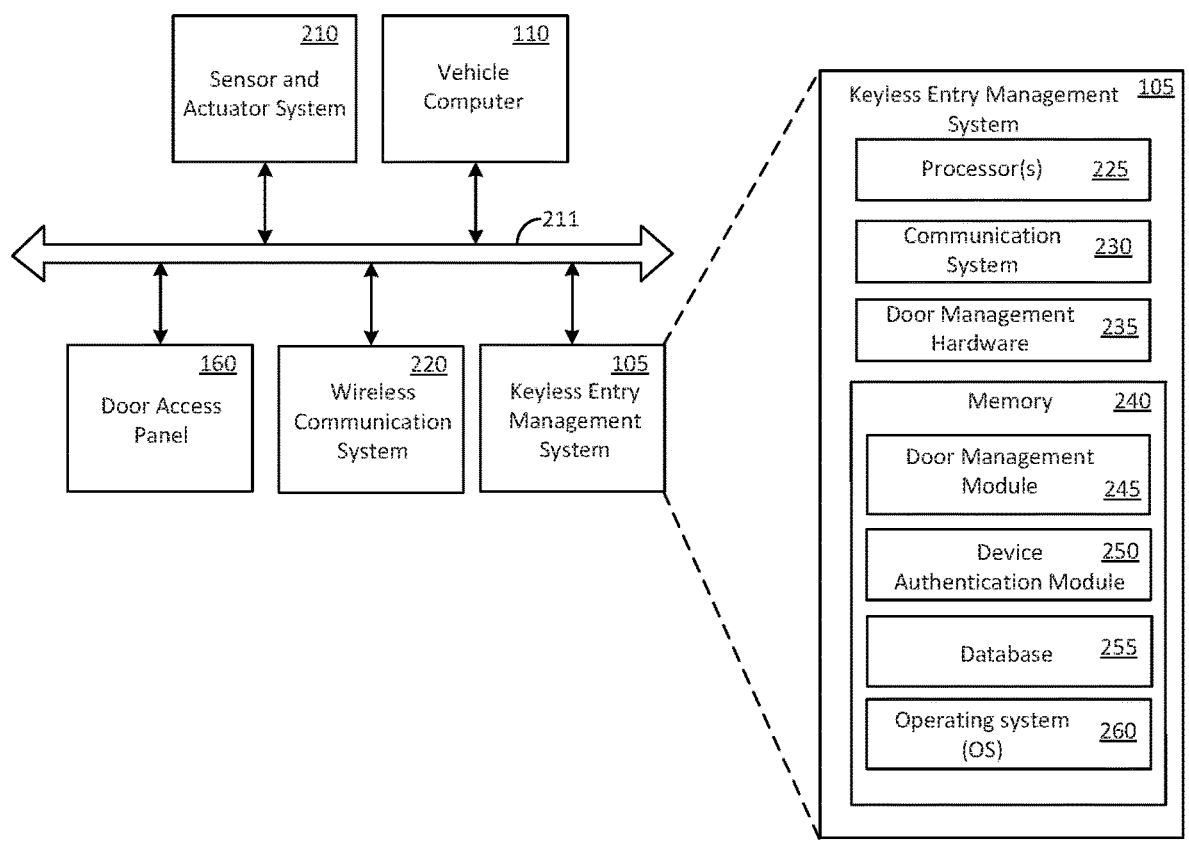
FIG. 2 shows some exemplary components that may be included in the vehicle shown in FIG. 1.

FIG. 2 shows some exemplary components that may be included in the vehicle 115. The exemplary components can include the keyless entry management system 105, the vehicle computer 110, the door access panel 160, a wireless communication system 220, and a sensor and actuator system 210. The various components are communicatively coupled to each other via one or more buses such as an exemplary bus 211. The bus 211 may be implemented using various wired and/or wireless technologies. For example, the bus 211 can be a vehicle bus that uses a controller area network (CAN) bus protocol, a Media Oriented Systems Transport (MOST) bus protocol, and/or a CAN flexible data (CAN-FD) bus protocol. Some or all portions of the bus 211 may also be implemented using wireless technologies such as Bluetooth®, Ultra-Wideband, Wi-Fi, Zigbee®, or near-field-communications (NFC). For example, the bus 211 may include a Bluetooth® communication link that allows the keyless entry management system 105 to wirelessly communicate with the PaaK device 120.

In one exemplary embodiment, the door access panel 160 includes a graphical user interface (GUI) (or a human-machine interface (HMI)) that may be used to accept input from the driver 135 of the vehicle 115, and also to display items such as messages, icons, and/or soft keys. The sensor and actuator system 210 can include various types of sensors such as, for example, an object sensor for detecting various objects such as the PEPS key fob 125 when the PEPS key fob 125 is present near, or inside, the vehicle 115. The sensor and actuator system 210 can also include various types of actuators such as, for example, a first actuator to unlock a door of the vehicle 115 and a second actuator to unlatch the door of the vehicle 115.

The wireless communication system 220 can include various wireless communication nodes such as the wireless communication nodes 130a, 130b, 130c, and 130d. In one exemplary implementation, some or all of the wireless communication nodes can include a Bluetooth® low energy module (BLEM) and/or a Bluetooth® low energy antenna module (BLEAM).

The keyless entry management system 105 may include a processor 225, keyless entry communication hardware 230, door management hardware 235, and a memory 240. The keyless entry communication hardware 230 can include one or more wireless transceivers (BLEAMs, for example) that allow the keyless entry management system 105 to transmit and/or receive various types of data from the PaaK device 120 via the wireless communication system 220. The keyless entry communication hardware 230 can also include hardware for communicatively coupling the keyless entry management system 105 to the network 150 for carrying out communications and data transfers with the server computer 140. In an exemplary embodiment in accordance with the disclosure, the keyless entry communication hardware 230 includes various security measures to ensure that messages transmitted between the keyless entry management system 105 and other elements such as the PaaK device 120 are not intercepted for malicious purposes. For example, the keyless entry communication hardware 230 may be configured to provide features such as encryption and decryption of messages, time-windows for transmitting and/or receiving of messages, and radio-frequency (RF) safeguards for RF signal transmissions.

The door management hardware 235 may include hardware such as one or more application-specific integrated circuits (ASICs) containing circuitry that allows the keyless entry management system 105 to interface with components such as the door access panel 160 for carrying out various actions in accordance with the disclosure.

The memory 240, which is one example of a non-transitory computer-readable medium, may be used to store an operating system (OS) 260, a database 255, and various code modules such as a door management module 245 and a device authentication module 250. The code modules are provided in the form of computer-executable instructions that can be executed by the processor 225 for performing various operations in accordance with the disclosure.

The door management module 245 may be executed by the processor 225 for performing various operations such as locking, unlocking, and unlatching various doors of the vehicle 115. For example, the door management module 245 may cooperate with the door access panel 160 for performing operations such as unlocking and unlatching a door of the vehicle 115 in accordance with various embodiments of the disclosure.

In one exemplary implementation, the database 255 may be used to store identification information related to one or more drivers of the vehicle 115. In another exemplary implementation, identification information related to one or more drivers of the vehicle 115 may be stored on the server computer 140 and fetched by the keyless entry management system 105 on an as-needed basis. In yet another exemplary implementation, identification information related to one or more drivers of the vehicle 115 may be stored in a cloud storage system and fetched by the keyless entry management system 105 on an as-needed basis. In some or all such implementations, the identification information may be stored in hashed form for security purposes.

Figure 3:
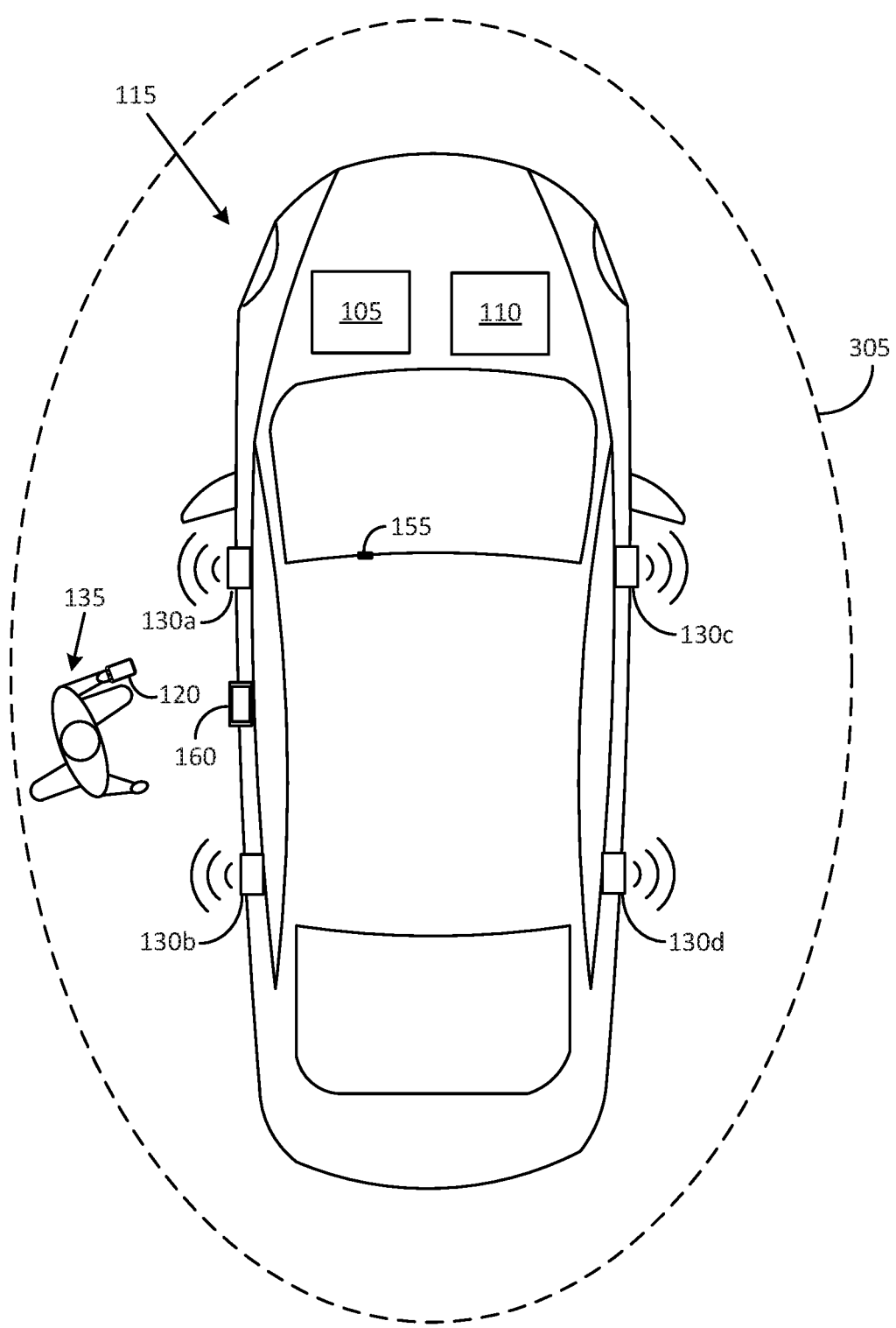
FIG. 3 shows an exemplary configuration in accordance with the disclosure that may be used for reducing latency when using a passive entry system to enter a vehicle.

FIG. 3 shows an exemplary configuration in accordance with the disclosure that may be used for reducing latency when using a passive entry system to enter the vehicle 115. In this exemplary configuration, the keyless entry management system 105 may cooperate with the first set of wireless communication nodes 130a, 130b, 130c, and 130d to determine if any PaaK device or any PEPS key fob is present inside a passive entry zone 305. The passive entry zone 305 may be defined in the form of a geofence by the processor 225 of the keyless entry management system 105. The dimensions of the geofence may be based on various parameters, such as, for example, a shape of the vehicle 115, a size of the vehicle 115, a number of doors of the vehicle 115, a layout of the doors of the vehicle 115, minimizing false detects, and operating characteristics of the wireless communication nodes 130a, 130b, 130c, and 130d (RF signal strength, antenna radiation pattern, etc.). The use of the geofence minimizes or eliminates an undesirable number of false detects that may occur if the wireless communication nodes 130a, 130b, 130c, and 130d detected a PaaK device and/or a PEPS key fobs carried by a person walking past the vehicle 115, or entering another vehicle that is parked beside the vehicle 115.

Figure 4:
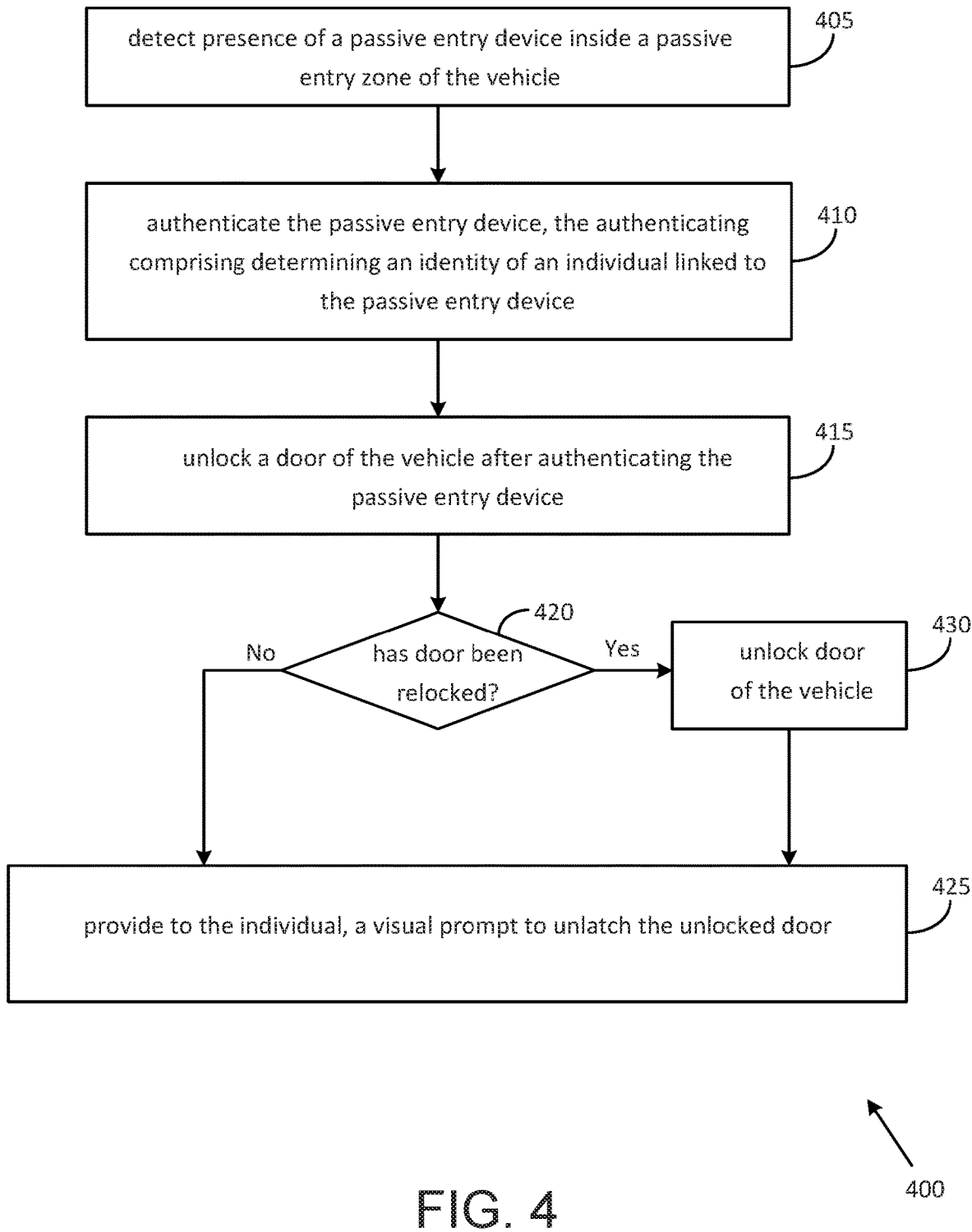
FIG. 4 shows a flowchart of an exemplary method in accordance with the disclosure for reducing latency when using a passive entry system to enter a vehicle.

FIG. 4 shows a flowchart 400 of an exemplary method in accordance with the disclosure for reducing latency when using a passive entry system to enter a vehicle. The flowchart 400 illustrates a sequence of operations that can be implemented in hardware, software, or a combination thereof. In the context of software, the operations represent computer-executable instructions stored on one or more non-transitory computer-readable media such as the memory 240, that, when executed by one or more processors such as the processor 225, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 400 may be carried out by using the keyless entry management system 105, the door access panel 160, the sensor and actuator system 210, and the wireless communication system 220. The description below may make reference to certain components and objects shown in FIGS. 1-3, but it should be understood that this is done for purposes of explaining certain aspects of the disclosure and that the description is equally applicable to many other embodiments.

At block 405, the presence of a passive entry device is detected inside a passive entry zone of a vehicle. For example, the keyless entry management system 105 can use one or more of the wireless communication nodes 130a, 130b, 130c, and 130d to detect the PaaK device 120 located inside the passive entry zone 305. The PaaK device 120 may be carried into the passive entry zone 305 by the driver 135 while walking towards a driver-side door of the vehicle 115 as illustrated in FIG. 3. In an exemplary implementation, one or more of the wireless communication nodes 130a, 130b, 130c, and 130d may track the PaaK device 120 (a smartphone, for example) from outside the passive entry zone 305, prior to entry of the PaaK device 120 into the passive entry zone 305.

At block 410, the keyless entry management system 105 may authenticate the PaaK device 120 by executing the device authentication module 250. The authentication may involve the processor 225 accessing the database 255 (or the server computer 140), to fetch and process data pertaining to the PaaK device 120. The data may include registration information of the PaaK device 120 and can also include an identity of an individual linked to the PaaK device 120.

At block 415, the keyless entry management system 105 may unlock a door of the vehicle 115 by using the door management hardware and the door management module 245. In one exemplary scenario, the keyless entry management system 105 may determine that the PaaK device 120 is located close to the driver-side door of the vehicle 115 and may use this information to open the driver-side door of the vehicle 115. There is a likelihood that the holder of the PaaK device 120 in this example is the driver 135. In another exemplary scenario, the keyless entry management system 105 may determine that the PaaK device 120 is located close to a rear passenger door of the vehicle 115 and may use this information to open the rear passenger door of the vehicle 115. There is a likelihood that the holder of the PaaK device 120 in this scenario is a passenger of the vehicle 115.

At block 420, the keyless entry management system 105 may make a determination whether the door that was unlocked has been relocked. The unlocked door may have been relocked for a variety of reasons. In one exemplary scenario, the vehicle 115 may be used for carpooling purposes, and the driver 135 is seated in the vehicle 115, parked and waiting to pick up one of the carpool passengers. The keyless entry management system 105 may detect the passenger approaching the vehicle 115 from a direction that has a blind spot where the driver 135 is unable to see the passenger. The keyless entry management system 105 may unlock one of the doors (or all doors) of the vehicle 115 when the PaaK device 120 carried by the passenger is detected inside the passive entry zone 305. The driver 135 may be alarmed upon hearing the automatic unlocking of the door(s) and may react by depressing a trim switch inside the vehicle 115 to relock the doors of the vehicle 115.

In another exemplary scenario, the vehicle 115 may be an autonomous vehicle that is used for providing ridesharing services. The PaaK device 120 that is detected by the keyless entry management system 105 may be a rideshare passenger inside the passive entry zone 305 of the autonomous vehicle. Another passenger who is already seated in the vehicle 115 may be alarmed upon hearing a door of the car being unlocked by the keyless entry management system 105 and may react by depressing a trim switch inside the vehicle 115 to relock the doors of the vehicle 115.

If at block 420, the doors of the vehicle 115 are relocked, at block 430, the keyless entry management system 105 unlocks the relocked door. The process of unlocking the relocked doors can be executed in various ways. In one exemplary implementation, the keyless entry management system 105 may execute an unlocking procedure that provides an indication to an occupant of the vehicle 115 such as the driver of the carpool vehicle or the rideshare passenger of the autonomous vehicle, that the unlocking operation is intentional. For example, the unlocking procedure may involve the keyless entry management system 105 broadcasting an explanatory audio message through an infotainment system of the vehicle 115, displaying an explanatory message on a display screen of an infotainment system of the vehicle 115, executing an unlock-relock-unlock sequence, and/or a brief beep of the horn of the vehicle 115.

In an alternative implementation in accordance with the disclosure, if at block 420, the doors of the vehicle 115 are relocked, at block 430, the vehicle 115 may provide a visual prompt to the driver to unlock a door of the vehicle 115 by using the door access panel 160.

In yet another alternative implementation in accordance with the disclosure, block 420 and block 430 may be omitted. When omitted, any attempts made to manually relock a door of the vehicle 115 that has been unlocked (block 415) will be explicitly prevented, for example, by disabling all the door-unlock trim switches in the vehicles 115 for a predetermined period of time.

If at block 420, the doors of the vehicle 115 have not been relocked, at block 425, the keyless entry management system 105 provides a visual prompt to the holder of the PaaK device 120 to unlatch the unlocked door. In one embodiment, the visual prompt may be displayed upon the GUI of the door access panel 160. In another embodiment, the visual prompt may be displayed upon the PaaK device 120, such as upon a screen of a smartphone.

The operations described above with reference to the flowchart 400 minimize latency when using the PaaK device 120 or any other passive entry device to enter the vehicle 115 by eliminating various delays that may be associated with actions such as obtaining a password from the PaaK device 120, verifying the password, and transmitting encoded messages back and forth for verifying the password.

Figure 5:
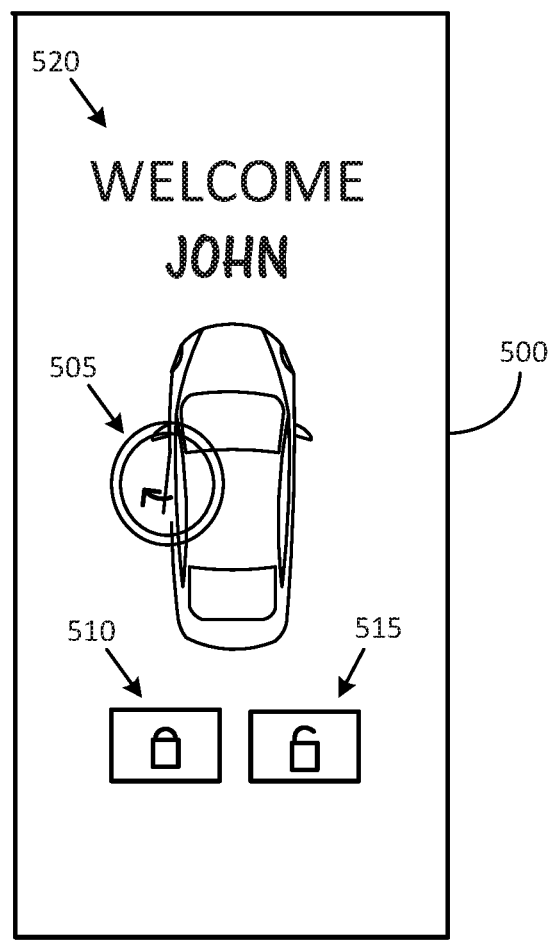
FIG. 5 shows a first exemplary visual prompt displayed by an entry management system of a vehicle in accordance with an embodiment of the disclosure.

FIG. 5 shows an exemplary visual prompt 500 displayed by the entry management system 105 upon a display screen in accordance with an embodiment of the disclosure. The visual prompt 500 includes a soft-key 505 that can be activated to unlatch an unlocked door of the vehicle 115, which in this example is a driver-side door of the vehicle 115. The soft-key 105 may be displayed in various forms so as to draw the attention of the holder of the PaaK device 120. In one case, the soft-key 505 may be provided in the form of a large green circle encircling the unlocked door. In another case, the soft-key 505 may be provided as a large flashing icon in the shape of a button. In yet another case, the soft-key 505 may include a text message that provides instructions to the holder of the PaaK device 120 on how to unlatch the unlocked door, and an identification of the unlocked door (the driver-side door, for example). The visual prompt 500 may also include other graphics and soft-keys such as a soft-key 510 for locking all doors of the vehicle 115 and another soft-key 515 for unlocking all doors of the vehicle 115. One exemplary graphic includes a personalized message 520 that may include a name of the person ("John W Smith") that is linked with the PaaK device 120, an abbreviated name ("John") of the person, or initials ("JWS") of the person.

Figure 6:
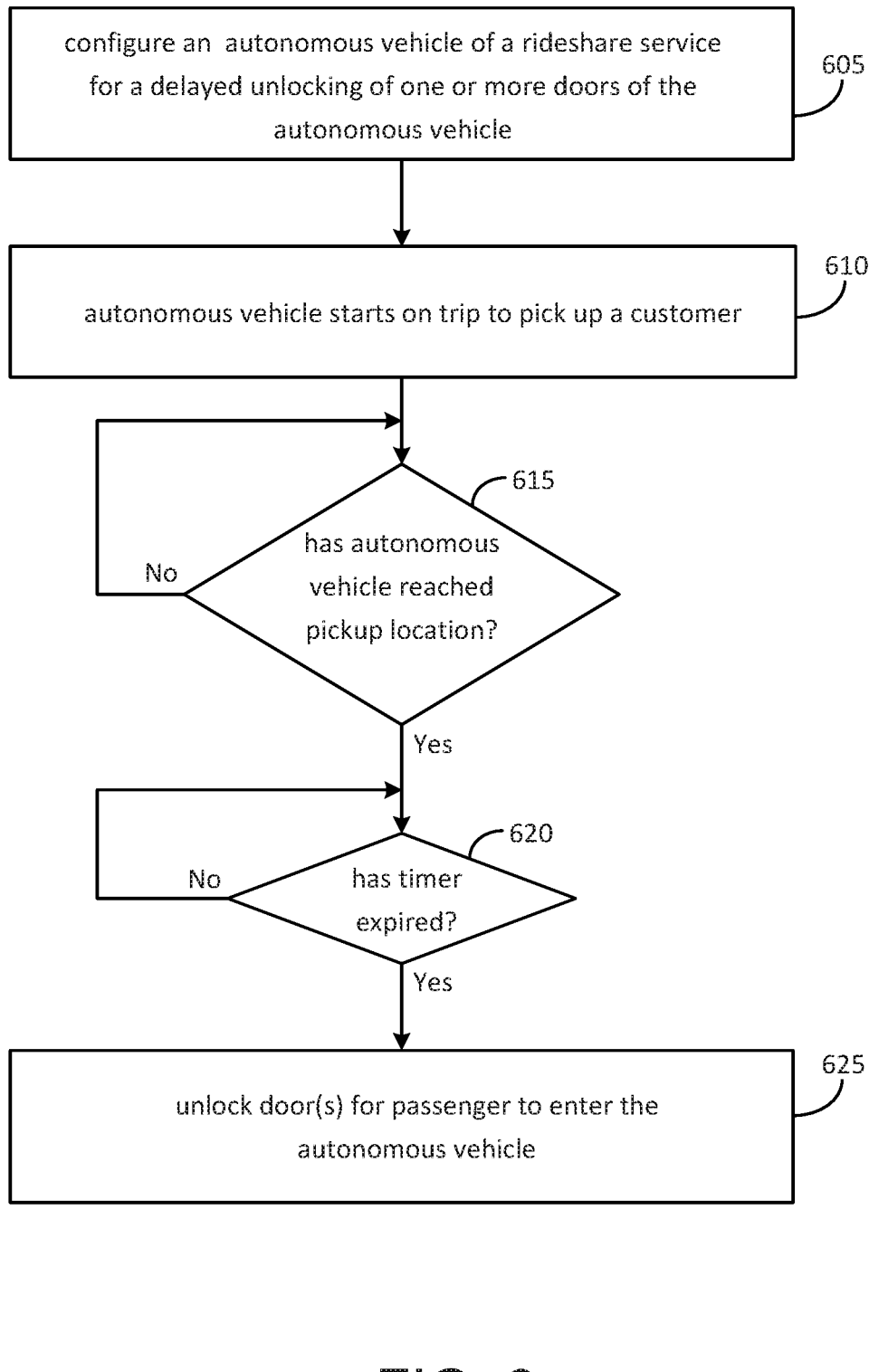
FIG. 6 shows a flowchart of an exemplary method in accordance with the disclosure for operating an entry management system in an autonomous vehicle.

FIG. 6 shows a flowchart 600 of an exemplary method in accordance with the disclosure for operating the entry management system 105 in an autonomous vehicle. At block 605, the autonomous vehicle is configured for a delayed unlocking of one or more doors. In one example implementation, the autonomous vehicle is operated by a ride share service and may be dispatched to pick up a customer at a pickup location. A dispatcher of the ride share service may estimate that the autonomous vehicle would take 45 minutes to drive to the pickup location. The dispatcher may then configure a count-down timer in the entry management system 105 to count down 45 minutes, or any other suitable time frame that can include a buffer time period or a shortened time period that is a little less than 45 minutes (40 minutes, for example). The entry management system 105 may be further configured to lock all doors of the autonomous vehicle when the timer has started the count down. It should be understood that any of various types of timing devices or timing procedures may be used in place of a count-down timer.

At block 610, the autonomous vehicle starts on the trip to pick up the customer. The count-down timer is in operation during the trip and it is expected that the autonomous vehicle will reach the pickup location at or around the time when the timer expires.

At block 615, a determination may be made whether the autonomous vehicle has reached the pickup location. In one exemplary implementation, the entry management system 105 may use location coordinates obtained from a global positioning system (GPS) device in the autonomous vehicle for this purpose.

At block 620, a determination may be made whether the count-down timer has expired. An expiry of the count-down timer may indicate to the entry management system 105 that the autonomous vehicle has reached the pickup location. If the count-down timer has expired, at block 625, the autonomous vehicle may unlock one or more doors of the autonomous vehicle and display a visual prompt that prompts the customer to enter the autonomous vehicle.

Figure 7:
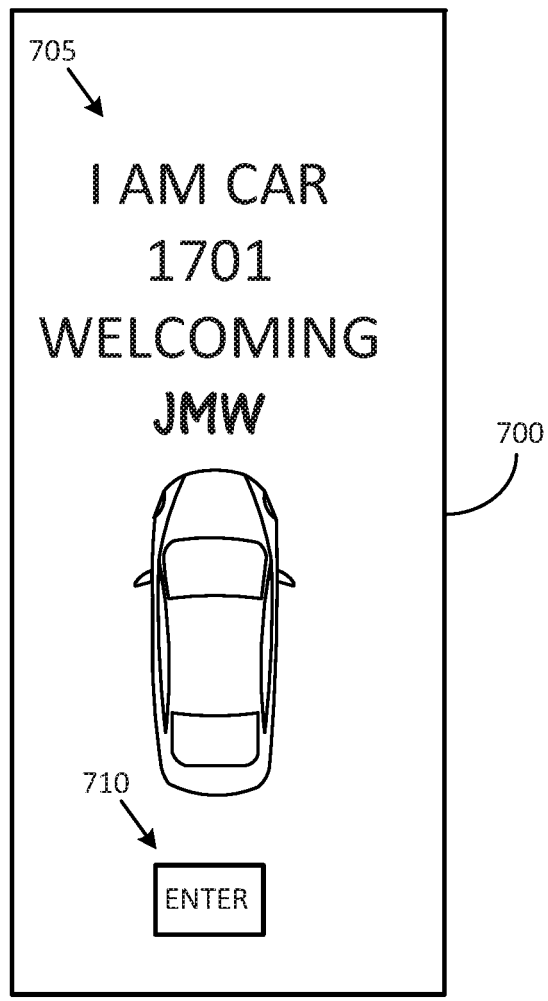
FIG. 7 shows a second exemplary visual prompt displayed by an entry management system of a vehicle in accordance with an embodiment of the disclosure.

FIG. 7 shows an exemplary visual prompt 700 displayed by the entry management system 105 to prompt the customer to enter the autonomous vehicle (at block 625 described above). The visual prompt may be displayed upon a display screen of the door access panel 160 in accordance with an embodiment of the disclosure. The visual prompt 700 includes a soft-key 710 that can be activated by the customer to unlatch an unlocked door of the autonomous vehicle. The soft-key 710 may be displayed in various forms so as to draw the attention of the customer. In one case, the soft-key 710 may be provided in the form of a large green circle encircling an unlocked door. In another case, the soft-key 710 may be provided as a flashing icon in the shape of a button. In yet another case, the soft-key 710 may include a text message that provides instructions to the customer on how to unlatch an unlocked door and an identification of the unlocked door. The visual prompt 700 may also include other graphics and soft-keys. One exemplary graphic includes a personalized message 705 that may include a name of the customer, or initials of the customer's name ("JMW").

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 240, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application-specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A non-transitory computer-readable medium storing computer-executable instructions that, when executed by a processor, cause the processor to perform operations of:
   detecting a presence of a passive entry device inside a passive entry zone of a vehicle;
   authenticating the passive entry device by determining an identity of a first individual linked to the passive entry device;
   unlocking a first door of the vehicle after authenticating the passive entry device; and
   displaying, on the vehicle and based on authenticating the passive entry device and unlocking the first door, a visual prompt to unlatch the first door by activating a first soft-key provided on a door access panel of the vehicle, on the passive entry device, or on a personal device carried by the first individual.

2. The non-transitory computer-readable medium of claim 1, wherein the door access panel comprises a graphical user interface customized for use by the first individual, and wherein the first soft-key comprises an unlatch icon displayed in the graphical user interface.

3. The non-transitory computer-readable medium of claim 1, wherein the computer-executable instructions further cause the processor to perform operations of:
   receiving from a second individual, a request to lock the first door;
   locking the first door; and
   providing to the first individual, an option to unlock the first door by activating a second soft-key provided on the door access panel of the vehicle.

4. The non-transitory computer-readable medium of claim 3, wherein the second soft-key is an unlock icon that is displayed upon the door access panel.

5. The non-transitory computer-readable medium of claim 1, wherein the computer-executable instructions further cause the processor to perform operations of:
receiving from a second individual, a request to relock the first door; and
disregarding the request to relock the first door.

6. The non-transitory computer-readable medium of claim 1, wherein the computer-executable instructions further cause the processor to perform operations of:
receiving from a second individual, a request to lock the first door; and
executing an operational sequence that includes acknowledging receipt of the request from the second individual, the operational sequence comprising locking all doors of the vehicle, followed by unlocking the first door of the vehicle.

7. A method comprising:
detecting an entry of a passive entry device into a passive entry zone of a vehicle;
authenticating the passive entry device by determining an identity of a first individual linked to the passive entry device;
unlocking a first door of the vehicle after authenticating the passive entry device; and
displaying, on the vehicle and based on authenticating the passive entry device and unlocking the first door, a visual prompt to unlatch the unlocked first door by activating a first soft-key provided on a door access panel of the vehicle.

8. The method of claim 7, wherein the first visual prompt is displayed upon at least one of a door access panel on the vehicle, the passive entry device, or on a personal device carried by the first individual.

9. The method of claim 8, wherein the first visual prompt includes a soft key operable to unlock the first door.

10. The method of claim 9, further comprising:
detecting an activation of the soft key;
unlocking the first door that was relocked; and
providing to the first individual, a second visual prompt to unlatch the unlocked first door.

11. The method of claim 9, wherein the soft key is a part of a graphical user interface that is customized to include one or more particulars of the first individual.

12. The method of claim 11, wherein the one or more particulars of the first individual is one of a name of the first individual, an abbreviated name of the first individual, or initials of the name of the first individual.

13. A vehicle, comprising:
a memory that stores computer-executable instructions; and
a processor configured to access the memory and execute the computer-executable instructions to at least:
detect a presence of a passive entry device inside a passive entry zone of the vehicle;
authenticate the passive entry device by determining an identity of a first individual linked to the passive entry device;
unlock a first door of the vehicle after authenticating the passive entry device; and
provide to the first individual, a visual prompt to unlatch the unlocked first door by activating a first soft key provided on a door access panel of the vehicle;
receive from a second individual, a request to lock the unlocked first door; and
execute an operational sequence that includes acknowledging receipt of the request from the second individual, the operational sequence comprising locking all doors of the vehicle, followed by unlocking of the first door of the vehicle.

14. The vehicle of claim 13, wherein the first soft key comprises an unlatch icon that is displayed upon the door access panel, and wherein the visual prompt is a message that is displayed on at least one of the door access panel, the passive entry device, or on a personal device carried by the first individual.

15. The vehicle of claim 13, wherein the door access panel comprises a graphical user interface customized for use by the first individual, and wherein the first soft key comprises an unlatch icon displayed in the graphical user interface.

16. The vehicle of claim 13, wherein the processor is further configured to access the memory and execute additional computer-executable instructions to at least:
receive from a second individual, a request to lock the unlocked first door;
lock the first door; and
provide to the first individual, an option to unlock the first door by activating a second soft key provided on the door access panel of the vehicle.

17. The vehicle of claim 16, wherein the second soft key is an unlock icon that is displayed upon the door access panel.

18. The vehicle of claim 13, further comprising:
receive from a second individual, a request to relock the unlocked first door; and
disregard the request to relock the unlocked first door.

19. The vehicle of claim 13, further comprising:
receive from a second individual, a request to lock the unlocked first door; and
execute an operational sequence that includes acknowledging receipt of the request from the second individual, the operational sequence comprising locking all doors of the vehicle, followed by unlocking of the first door of the vehicle.

* * * * *